United States Patent

Stieringer

[15] 3,644,029
[45] Feb. 22, 1972

[54] SLIDE PROJECTOR

[72] Inventor: Albert Stieringer, Calmbach, Germany

[73] Assignee: Robert Bosch GmbH, Stuttgart-Unterturkheim, Germany

[22] Filed: Aug. 6, 1969

[21] Appl. No.: 848,010

[30] Foreign Application Priority Data

Aug. 14, 1968 Germany..................P 17 97 084.1

[52] U.S. Cl............................................353/103, 353/114
[51] Int. Cl................................................G03b 23/02
[58] Field of Search...................353/92, 93, 114, 116, 103

[56] References Cited

UNITED STATES PATENTS 2,949,814    8/1960    Boughton et al.......................353/101
3,334,544    8/1967    Zillmer..................................353/101
3,413,060    11/1968   Rube.......................................353/21

*Primary Examiner*—Harry N. Haroian
*Attorney*—Michael S. Striker

[57] ABSTRACT

A slide projector wherein the slide changer comprises two arms connected to each other by a coupling and wherein the gate is normally overlapped by a shutter. One of the arms serves to move the shutter away from closed position by way of a slide which is being transported from the magazine to projection position, and the other arm serves to return the slide from projection position back to the magazine. When the operator wishes to skip a slide and to retain the shutter in closed position, the coupling is disengaged to hold the one arm against movement with the other arm until a desired slide reaches the position from which it can be transported into registry with the gate.

10 Claims, 4 Drawing Figures

PATENTED FEB 22 1972 3,644,029

INVENTOR

ALBERT STIERINGER

BY his ATTORNEY

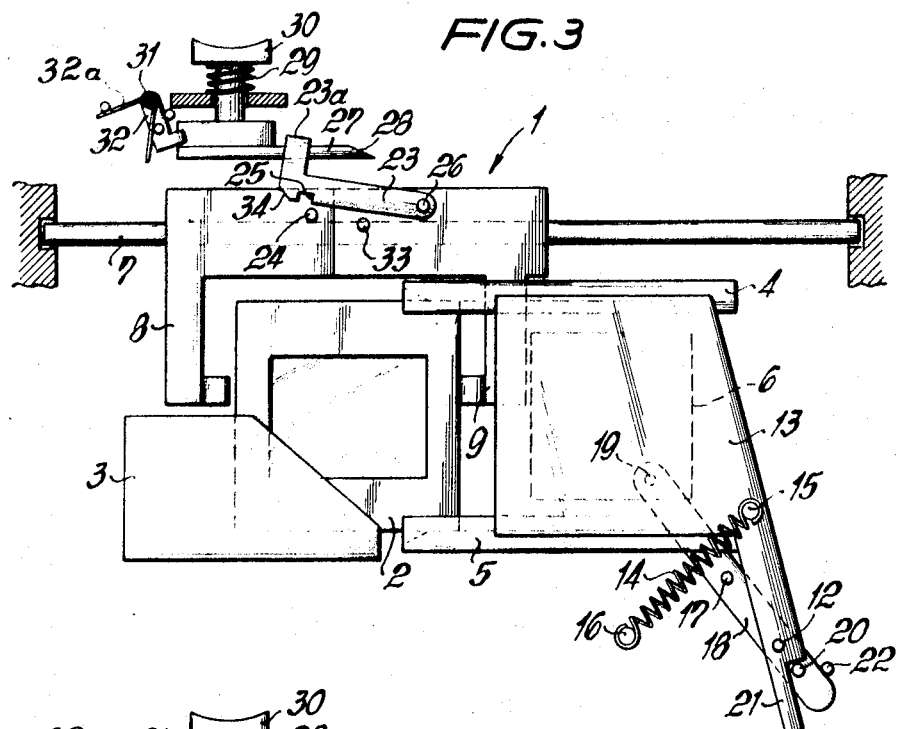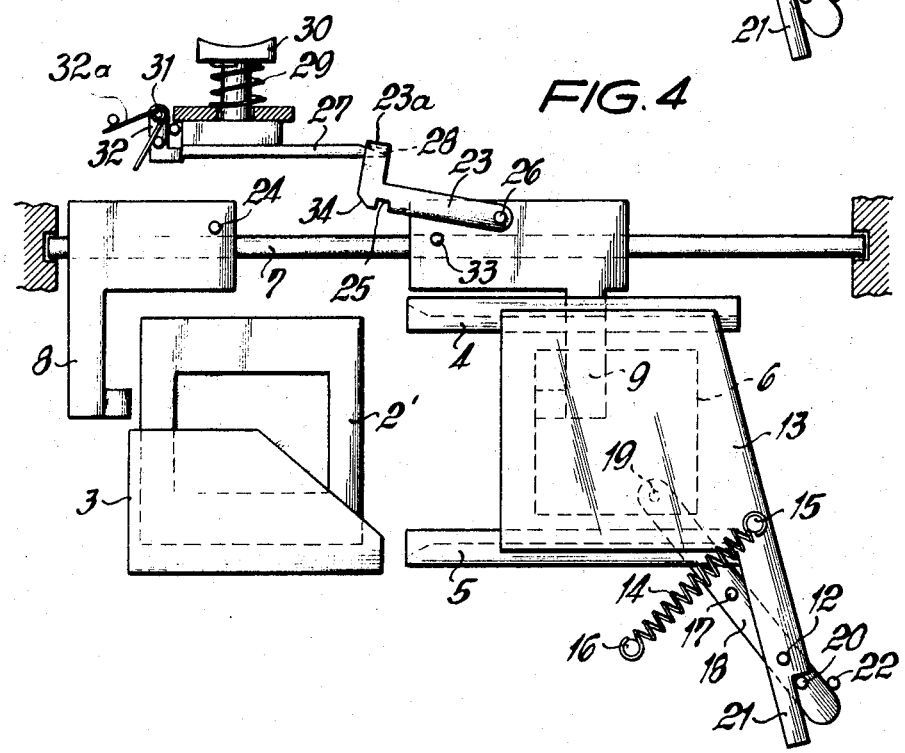

SLIDE PROJECTOR

BACKGROUND OF THE INVENTION

The present invention relates to slide projectors in general, and more particularly to improvements in slide projectors of the type comprising a shutter which normally prevents light emitted by the projection lamp from reaching a projection screen. Such shutters are provided for the purpose of concealing the slides during transport to and from projection position.

It is known to provide slide projectors with devices which enable the operator to "skip" a slide, i.e., to prevent the projection of the image of a particular slide even if such slide is accommodated in a compartment of a magazine which is automatically indexed in stepwise fashion to move successive slides into the range of the slide changer. German Pat. No. 1,253,931 discloses a slide projector wherein the slide changer comprises a motion transmitting member which directly engages the shutter when the slide changer is caused to move in a direction to transport a slide to projection position. The projector is provided with means for moving the motion transmitting member to an idle position in which the latter cannot open the shutter. Thus, a slide which is transported to projection position is not shown as long as the motion transmitting member remains in inoperative position.

In certain types of slide projectors, the slide which is being transported from the magazine to projection position, i.e., into registry with the projection gate, serves as a means for opening the shutter. In such projectors, the motion transmitting member of the aforementioned German patent could not perform its intended function. An advantage of projectors wherein the slide directly engages and opens the shutter is that the shutter invariably remains in closed position when there is no slide in projection position.

SUMMARY OF THE INVENTION

An object of the invention is to provide a slide projector of the type wherein the slides may serve as a means for opening the shutter with novel and improved means for maintaining the shutter in closed position at the will of the operator so that the operator can skip one or more bad slides or one or more slides which should not be shown to the audience for another reason.

Another object of the invention is to provide a slide projector wherein the means for opening the shutter may but need not include a slide and wherein the shutter always remains closed when there is no slide in projection position.

A further object of the invention is to provide a slide projector wherein the slide changer is constructed, assembled and operated in a novel and improved way.

An additional object of the invention is to provide a slide projector with novel means for rendering the slide changer ineffective during one or more successive indexing movements of the magazine.

Another object of the invention is to provide a slide projector wherein the slide which is not to be shown need not be removed from the corresponding compartment of the slide magazine or tray.

The invention is embodied in a slide projector which comprises transporting means (such as a straight or circular magazine or tray) for moving discrete slides individually to and from a predetermined position, slide changer means actuable to move a slide from such predetermined position to a projection position and vice versa, shutter means movable to and from a closed position in which it blanks the light beam from the viewing screen; motion transmitting means forming part of the slide changer means and normally operative to effect movement of the shutter means from closed position in response to actuation of the slide changer means (such motion transmitting means may include an arm of the slide changer means which pushes a slide from its predetermined position to the projection position whereby the slide directly or indirectly moves the shutter means from closed position), manually operated or power-driven actuating means for the slide changer means, and disengageable coupling means interposed between the motion transmitting means and the actuating means to effect operation of the motion transmitting means in engaged condition and to prevent operation of the motion transmitting means in disengaged condition of the coupling means. Such coupling means can be installed between two separable portions of the slide changer means or in the operative connection between the slide changer means and the actuating means.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 illustrates the structure of FIG 1 but with the coupling means in disengaged condition; and FIG. 4 illustrates the structure of FIG. 1 with the female portion of the coupling means in the process of becoming separated from the disengaging means.

DESCRIPTION OF THE PREFERRED EMBODIMENTS

Figure 1:
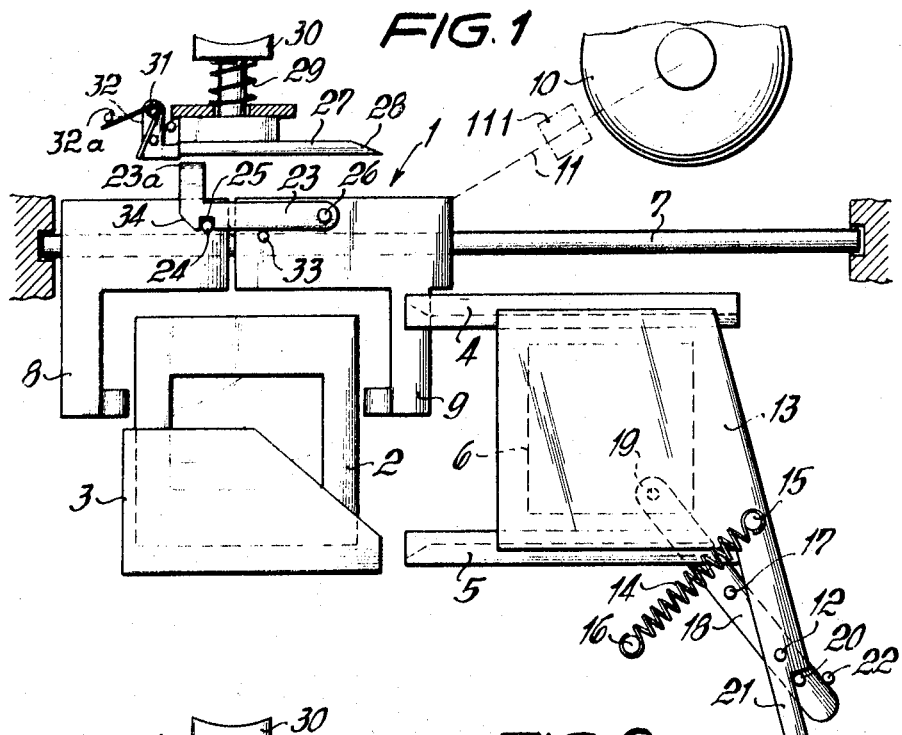
FIG. 1 is a fragmentary transverse vertical sectional view of a slide projector which embodies the invention, the shutter means being shown in closed position and the slide changer means being shown in that end position in which it is ready to transport a slide to projection position.
Figure 2:
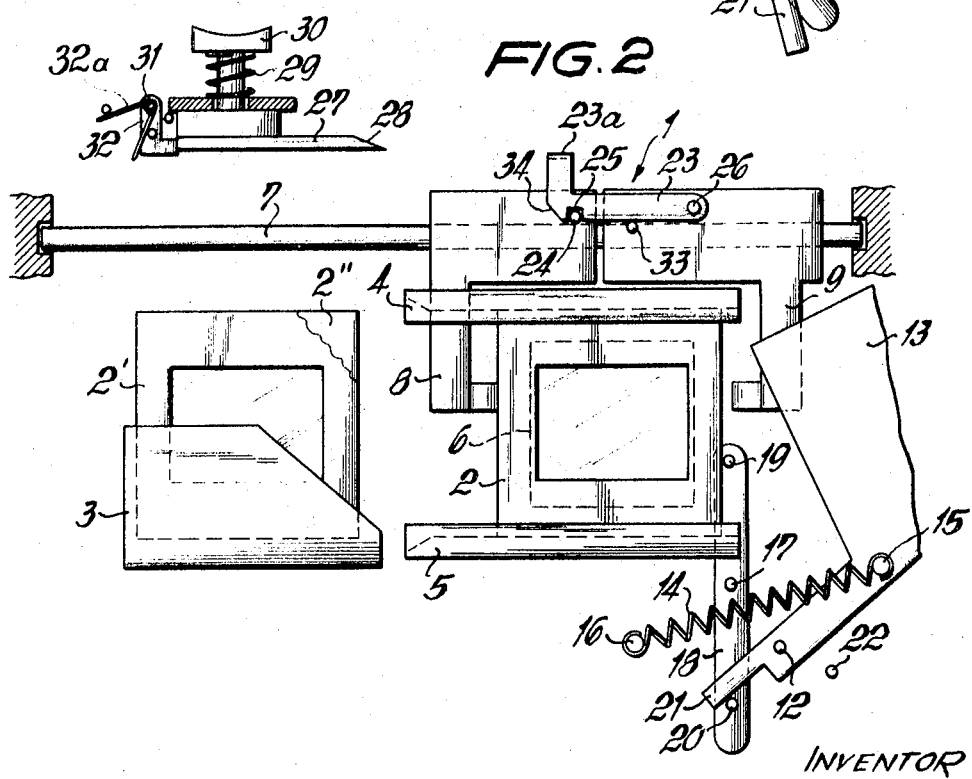
FIG. 2 illustrates the structure of FIG. 1 but with the slide changer means in the other end position in which a slide maintains the shutter means in open position.

Referring first to FIGS. 1 and 2, there is shown a portion of a slide projector which comprises a slide changer 1 reciprocable between a first end position (shown in FIG. 1) in which it is in a requisite position with reference to a selected slide 2 stored in a compartment of a slide transporting magazine or tray 3, and a second end position (shown in FIG. 2). During movement from the first to the second end position, the slide changer 1 transports the slide 2 of FIG. 1 sideways (i.e., in the plane of the slide) and locates such slide in a projection position shown in FIG. 2 in which the light-transmitting portion of the slide is in registry with a projection gate 6. The housing of the slide projector accommodates two guide rails 4, 5 which respectively guide the frame of the slide 2 from above and from below during transport from the predetermined position of FIG. 1 to the projection position of FIG. 2. The housing of the projector further accommodates a horizontal rod 7 which is mounted in the sidewalls of the housing and serves as a support and as a guide for the slide changer 1. The latter comprises two motion transmitting arms 8 and 9 which flank the slide 2 in the first end position of the slide changer (FIG. 1). The arm 8 serves as a means for moving the slide 2 from the predetermined position of FIG. 1 to the projection position of FIG. 2, and the arm 9 serves to return the slide 2 from the projection position to the predetermined position. The magazine 3 serves as a means for storing slides in a predetermined order as well as a component part of the transporting means which advances the slides at right angles to the plane of FIG 1 or 2 so as to place a selected slide into the plane of the projection gate 6 and guide rails 4,5.

The actuating means for effecting movements of the slide changer 1 between the two end positions includes an electric motor 10 which is operatively connected with the slide changer by a power train 11 (indicated by phantom lines). Such power train may include a crank drive, a system of links, levers, gears or the like.

The housing of the slide projector further supports a stationary pivot pin 12 for a shutter 13 which normally overlies the projection gate 6. The main purpose of the shutter 13 is to interrupt the light beam from the projection lamp (not shown) to the projection screen (not shown) during transport of a slide between the corresponding compartment of the magazine 3 and the projection position. A helical spring 14 is provided to permanently bias the shutter 13 to the closed position shown in FIG. 1; one end of this spring is coupled to a post 15 on the shutter 13 and its other end is attached to a post 16 which is fixed to the housing of the slide projector. The means for directly engaging the shutter 13 for the purpose of moving it from closed position includes a two-armed lever 18 which is pivotable on a fixed pivot pin 17 of the housing and whose upper arm carries a motion receiving pin 19 extending into the path of movement of a slide 2 from the magazine 3 to the projection position. The other (lower) arm of the lever 18 carries a pin 20 which engages an extension 21 of the shutter 13. A stationary stop 22 is provided in the housing to hold the lever 18 and shutter 13 in the positions shown in FIG. 1 when the spring 14 is free to contract. The stop 22 is mounted in such a way that it holds the shutter 13 in the closed position of FIG. 1 when there is no slide in the projection position, i.e., when the light beam issuing from the projection lamp would be free to reach the projection screen without passing through the transparency of a slide.

In accordance with a presently preferred embodiment of my invention, the slide changer 1 comprises two portions or sections one of which includes the arm 8 and the other of which includes the arm 9. The two portions are normally connected to each other by a disengageable coupling which includes a female coupling member or hook 23 and a male coupling member or stud 24. The hook 23 is pivoted to the arm 9, as at 26, and has a notch or mouth 25 which normally receives the stud 24. The latter is attached to the arm 8. The portion which includes the arm 9 is connected with the motor 10 by the power train 11; thus, when the coupling including the parts 23, 24 is disengaged, the arm 9 can move with reference to the arm 8.

The device for disengaging the coupling 23, 24 at the will of the operator comprises a knob 30 which is biased upwardly, as viewed in the drawing, by a helical spring 29 and is accessible at the outer side of the projector housing. The stem of the knob 30 carries a disengaging member or rail 27 which has a suitably inclined cam portion or ramp 28 adapted to engage a follower portion 23a provided on the hook 23. A lever 32 serves as a means for releasably locking the rail 27 in the operative position shown in FIG. 3. This lever is turnable on a pivot pin 31 of the housing and is biased by a torsion spring 32a which tends to turn it in a counterclockwise direction. The hook 23 is provided with a suitably inclined edge face 34 which enables the hook to pivot in a clockwise direction during movement of the arm 9 toward the position shown in FIG. 1 provided that the arm 8 is disconnected from the arm 9 and that the rail 27 is permitted to assume the inoperative position shown in FIG. 1 or 2.

The Operation

The magazine 3 is indexed in a well-known manner so as to place a selected slide 2 into the plane of the guide rails 4 and 5. Once the slide 2 of FIG. 1 reaches such plane, the motor 10 causes the slide changer 1 to move from the end position of FIG. 1 to the end position of FIG. 2 whereby the arm 8 pushes the slide 2 toward the projection position of FIG. 2 in which the transparency of the slide registers with the projection gate 6. The frame of the thus transported slide 2 is properly held in the channels of the rails 4 and 5. Shortly before the slide 2 reaches the projection position, the right-hand edge of its frame engages the pin 19 of the lever 18 whereby the latter pivots in a clockwise direction and its pin 20 pivots the shutter 13 so that the shutter leaves the closed position of FIG. 1 and permits light to pass through the slide 2 when the latter reaches the projection position. The spring 14 is caused to store energy and is ready to return the shutter 13 to the closed position of FIG. 1 as soon as the arm 9 effects some return movement of the slide 2 from the projection position toward the corresponding compartment of the magazine 3. Thus, the projection screen is illuminated only during that interval when the slide 2 dwells in the projection position shown in FIG. 2.

The motor 10 can move the slide changer 1 back and forth at predetermined intervals or in response to signals produced by the operator of the slide projector. As stated above, the slide 2 is moved away from the pin 19 on the lever 18 shortly after it leaves the projection position so that the spring 14 is free to contract and to return the shutter 13 to the closed position of FIG. 1. This insures that the audience need not observe the transfer of slides to and from projection position. When the slide 2 returns into the corresponding compartment of the magazine 2 in front of the next-following slide 2' (FIG. 2), the magazine 3 is indexed by a step to place the slide 2' into the plane of the guide rails 4 and 5. The indexing mechanism for the magazine 3 forms part of the aforementioned transporting means for the slides and may include a customary rack provided on the magazine 3 and a pinion which meshes with the rack and can be rotated by hand or by the motor 10. At the present time, the just mentioned pinion is preferably rotated by the arm 9 of the slide changer 1; thus, the arm 9 can turn the pinion through a predetermined angle shortly before it returns to the position shown in FIG. 1 so that the magazine 3 is indexed after the slide 2 returns into the corresponding compartment.

If the operator of the projector decides that the image on the slide 2' should not be shown to the audience, he simply depresses the knob 30 against the opposition of the spring 29 before the slide changer 1 returns from the position of FIG. 2 to the position of FIG. 1, i.e., before the follower 23a of the hook 23 reaches the ramp 28 of the rail 27. The knob 30 can be released immediately after depression because the spring 32a biases the lever 32 to the locking position shown in FIG. 3 and this lever then prevents return movement of the rail 27. Once the rail 27 is locked in the operative position of FIG. 3, its ramp 28 extends into the path of movement of the follower 23a. This follower may constitute a suitably deformed or bent portion of the hook 23 and, when it ravels along the face of the ramp 28, the hook 23 is disengaged from the pin 24 to thus uncouple the arm 9 from the arm 8. Shortly before the arm 9 returns to the position shown in FIG. 1, the follower 23a of the hook 23 disengages the locking lever 32 from the rail 27 whereby the spring 29 expands and lifts the rail 27. The rail effects additional pivotal movement of the hook 23 in a clockwise direction (FIG. 4). The just described sequence of steps is carried out while the arm 9 is in the process of returning the slide 2 into the corresponding compartment of the magazine 3. When the magazine is thereupon indexed to place the next slide 2' into the plane of the guiderails 4, 5, the arm 8 is disengaged from the arm 9 so that the motor 10 merely transports the arm 9 but the arm 8 remains in the end position shown in FIG. 4. Consequently, the slide 2' remains in its compartment and the shutter 13 remains in closed position because the lever 18 can be pivoted only by a slide but not by the arm 9. Thus, when the motor 10 moves the arm 9 back and forth, this arm completes a "dry" run, i.e., no slide is transported to the projection position when the arm 9 moves away from the arm 8 and no slide is returned into the magazine 3 when the arm 9 moves toward the arm 8 (which latter dwells in the position shown in FIG. 4). The projection screen remains dark because the shutter 13 dwells in the closed position of FIG. 1.

However, when the arm 9 moves away from the arm 8, the follower 23a of the hook 23 slides along and off the ramp 28 so that the hook 23 is free to turn by gravity (in a counterclockwise direction, as viewed in FIG. 3), until it reaches a stop post 33 which holds it in an optimum position for reengagement with the stud 24. The follower 23a is then located at a level below and can bypass the rail 27 when the motor 10 causes the arm 9 to travel toward the arm 8. During such travel of the arm 9, the inclined edge face 34 of the hook 23 slides along the stud 24 and the hook thereupon pivots by gravity to reengage the stud 24 and to thus reestablish the connection between the motor 10 and arm 8. As soon as the arm 9 comes to a halt, the magazine 3 is advanced by a step to move the slide 2' beyond the plane of the rails 4, 5 and to place the next-following slide 2" into such plane. When the motor 10 thereupon causes the slide changer 1 to leave the position shown in FIG. 1, the slide 2" is transported toward the projection position in the same way as described in connection with the slide 2 and the frame of the slide 2" causes the shutter 13 to open.

The selection of those slides which should not be shown to the audience can be facilitated by referring to customary numbers which are provided on the magazine adjacent to each compartment. Such numbers are normally visible in an observation window provided in the housing of the slide projector, i.e., the operator can see the number denoting that compartment which is located in the plane of the guide rails 4, 5. The operator can prepare a list of those slides which should not be shown; however, such work can be dispensed with if the projector is provided with a customary previewing system which permits observation of successive slides before a slide reaches the plane of the guide rails. Such previewing system normally comprises a separate slide changer which moves successive slides from the magazine between each pair of successive indexing movements of the magazine. The operator is then in a position to preview each slide and to decide whether or not a slide should be moved to the projection position. A suitable previewing system is disclosed, for example, in U.S. Pat. No. 3,394,478 to H. Rube which is assigned to the same assignee.

It is clear that the improved slide projector is susceptible of many modifications without departing from the spirit of the present invention. For example, the coupling including the hook 23 and stud 24 can be replaced with a different coupling or such coupling can be provided in the operative connection 11; in such projectors, the arm 8 can be integral with the arm 9. When the coupling in the connection 11 (indicated in FIG. 1 by phantom lines, as at 111) is disengaged, the motor 10 operates without moving the slide changer back and forth along the rod 7.

The motor 10 can be omitted if the slide changer 1 is provided with a manually operable handle; however, such handle may be provided in addition to the motor. Also, the coupling between the motor 10 and the arm 8 can be designed in such a way that it can disengage the arm 9 from the arm 8 for an interval during which the magazine 3 is indexed twice or more than twice.

It will be noted that, in the embodiment which is shown in the drawing, the arm 8 constitutes a motion transmitting portion of the slide changer 1 and performs two functions, namely, of moving the slides from the compartments of the magazine 3 into the projection position of registry with the gate 6 and of normally effecting movement of the shutter 13 from closed position when the arm 8 is coupled to the arm 9 and the motor 10 operates in a manner in which it normally actuates the slide changer 1 to move a slide to projection position. Such movement of the shutter 13 from closed position is effected by way of that slide which is located in the plane of the rails 4, 5. The situation is the same when the coupling 23, 24 is replaced by the coupling 111.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

1. In a slide projector, a combination comprising transporting means for moving slides to and from a predetermined position; slide changer means actuatable to move a slide between said predetermined position and a projection position; shutter means movable to and from a closed position in which it blanks the light beam from the viewing screen, said slide changer means including motion transmitting means normally operative to effect movement of said shutter means from closed position in response to actuation of said slide changer means; actuating means for said slide changer means; and disengageable coupling means interposed between said motion transmitting means and said actuating means to effect the operation of said motion transmitting means in engaged condition and to prevent operation of said motion-transmitting means in disengaged condition thereof.

2. A combination as defined in claim 1, wherein said slide changer means comprises two separable portions one of which includes said motion-transmitting means, said coupling means being arranged to normally connect said portions to each other and further comprising disengaging means for disengaging said coupling means so that the other portion of said slide changer means is then movable with reference to said one portion.

3. A combination as defined in claim 2, further comprising an operative connection between said actuating means and the other portion of said slide changer means.

4. A combination as defined in claim 2, wherein said coupling means comprises a female coupling member provided on one portion and a male coupling member provided on the other portion of said slide changer means, one of said coupling members being movable with reference to the respective portion of said slide changer means into and away from engagement with the other coupling member.

5. A combination as defined in claim 4, wherein said male coupling member is a stud and said female coupling member is a hook which is pivoted to the respective portion of said slide changer means.

6. A combination as defined in claim 5, wherein said disengaging means comprises a disengaging member movable between an operative and an inoperative position and a follower provided on said hook and arranged to track said disengaging member in the operative position of said disengaging member to thereby disengage the hook from said stud in response to actuation of said slide changer means.

7. A combination as defined in claim 6, wherein said disengaging means further comprises spring means for biasing said disengaging member to inoperative position and manually operated means for moving said disengaging member to operative position.

8. A combination as defined in claim 6, further comprising locking means for releasably holding said disengaging member in operative position.

9. A combination as defined in claim 8, wherein said hook is arranged to disconnect said locking means from said disengaging member in response to movement of the corresponding portion of said slide changer means to that position thereof which said portion assumes when the slide changer means is ready to move a slide from said predetermined position.

10. A combination as defined in claim 1, further comprising an operative connection provided between said slide changer means and said actuating means and including said coupling means.

* * * * *